United States Patent [19]

Garrison et al.

[11] 4,454,101

[45] Jun. 12, 1984

[54] DEWATERING OF FLUE GAS DESULFURIZATION SULFITE SOLIDS

[75] Inventors: Forrest C. Garrison, Chattanooga, Tenn.; William L. Wells, Champaign, Ill.

[73] Assignee: Tennessee Valley Authority, Muscle Shoals, Ala.

[21] Appl. No.: 508,969

[22] Filed: Jun. 29, 1983

Related U.S. Application Data

[63] Continuation of Ser. No. 444,127, Nov. 24, 1982, Pat. No. T103,501.

[51] Int. Cl.$^3$ .................. C01B 17/00; C01B 17/45; C01B 17/62
[52] U.S. Cl. .................. 423/242; 423/512 A; 423/519
[58] Field of Search .......... 423/242 A, 242 R, 244 A, 423/244 R, 512 A, 519

[56] References Cited

U.S. PATENT DOCUMENTS

| | | | |
|---|---|---|---|
| 2,154,996 | 4/1939 | Rawling | 423/512 A |
| 3,906,080 | 9/1975 | Gorin et al. | 423/242 A |
| 3,937,787 | 2/1976 | Gorin et al. | 423/242 A |
| 4,208,395 | 6/1980 | Gorin | 423/242 |
| 4,294,807 | 10/1981 | Randolph | 423/242 A |

*Primary Examiner*—Gregory A. Heller
*Attorney, Agent, or Firm*—Robert A. Petrusek

[57] ABSTRACT

The dewatering capabilities of sulfite sludges from flue gas desulfurization facilities are substantially improved by the addition of relatively small amounts of sodium thiosulfate additive, or additives derived from or related to sodium thiosulfate, into the scrubber slurry liquor. As an added embellishment, these predetermined amounts of said additives are greater than those required for effecting substantial scale inhibition in the scrubber innards. Subsequently, conventional dewatering of the sulfite sludge to about 80 to 90 percent solids directly produces a waste product disposable in both an economically and an environmentally acceptable manner, in that the thixotropic characteristics of such sludges which are associated therewith upwards to about 70-percent solids therein are completely eliminated.

12 Claims, 5 Drawing Figures

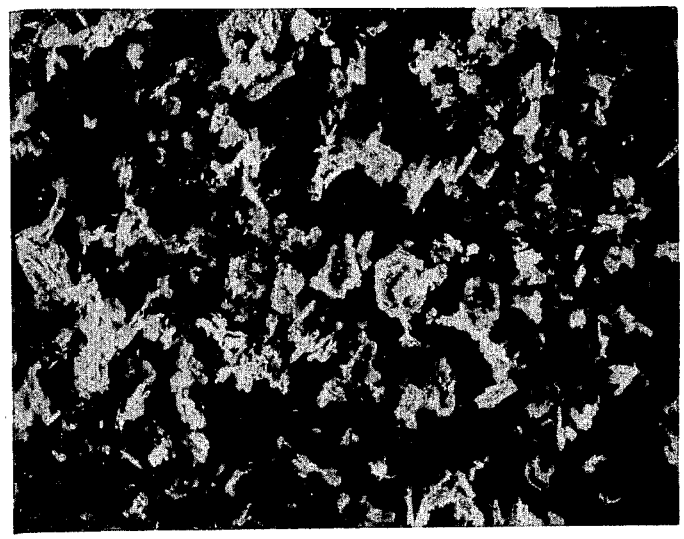
FLUFFY AGGLOMERATES OF MICACEOUS CALCIUM SULFITE
HEMIHYDRATE CRYSTALS
(200 X)
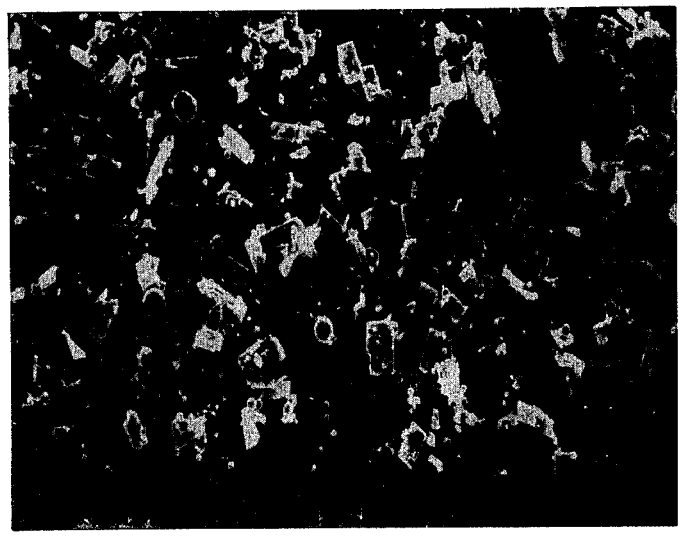
MONOCRYSTALLINE PARTICLES OF CALCIUM SULFITE HEMIHYDRATE
(200 X)
FIG 4

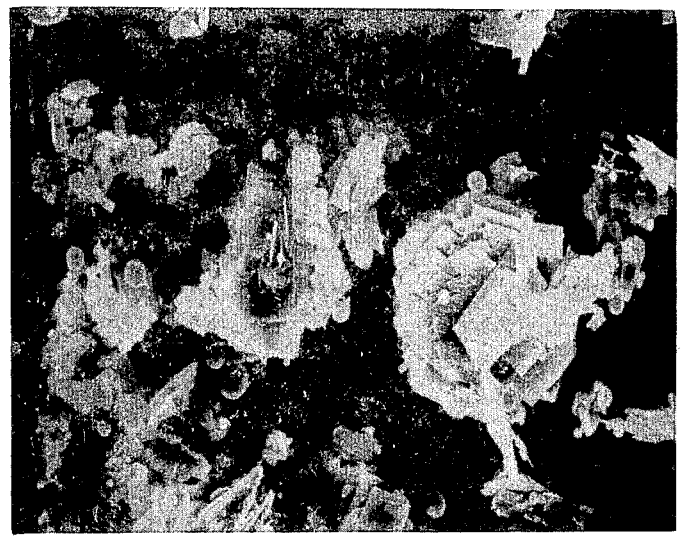
POROUS LAMELLAR AGGREGATES OF RANDOMLY ORIENTED MICACEOUS
CRYSTALLITES OF CALCIUM SULFITE HEMIHYRATE WITH ASSOCIATED
SPHERICAL FLY ASH
(700 X)
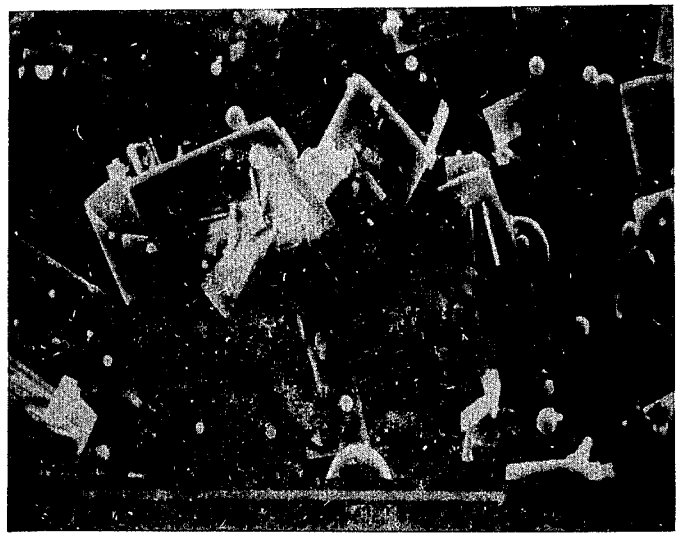
TABULAR PRISMATIC SINGLE CRYSTALS OF CALCIUM SULFITE HEMIHYDRATE
WITH ASSOCIATED SPHERICAL FLY ASH
(700 X)
FIG. 5

DEWATERING OF FLUE GAS DESULFURIZATION SULFITE SOLIDS

The invention herein described may be manufactured and used by or for the U.S. Government for governmental purposes without the payment to us of any royalty therefor.

This application is a continuation of application Ser. No. 444,127, filed Nov. 24, 1982, for DEWATERING OF FLUE GAS DESULFURIZATION SULFITE SOLIDS now Defensive Publication No. T103,501, published Oct. 4, 1983.

INTRODUCTION

Generally, the area of the flue gas desulfurization may be divided into two categories. One of these is recovery systems wherein an absorbent material is added to the scrubbing loop, combines with the $SO_2$ in the gases to be scrubbed, and forms an intermediate product. Said intermediate product is subsequently processed to obtain therefrom for recycle to the scrubber loop a regenerated absorbent material, and a useful and economically attractive byproduct is recovered. The other general category of flue gas desulfurization comprises the throwaway approach wherein a relatively inexpensive absorbent material is introduced into the scrubbing liquor, the $SO_2$ values in the flue gas introduced thereinto are combined with said material, and the resulting byproduct is sent to waste disposal. Throwaway systems also include those systems that reclaim the absorbent with cheaper materials such as lime or limestone but discard the secondary waste product. This includes some of the "double alkali" systems described later which utilize lime or limestone and make a waste product in the secondary loop. At the present time, the art of flue gas desulfurization tends toward the throwaway scrubbing type systems, primarily those utilizing lime and limestone. These throwaway scrubbing approaches produce significant quantities of waste materials for which there are few potential prospects for largescale utilization thereof. Accordingly, the waste products from these throwaway scrubbing approaches present a disposal problem which must be acceptably resolved from both economical and environmental considerations. The immediate byproduct from these throwaway systems are slurries containing substantial amounts of water. One early approach to waste disposal thereof was the method utilizing the ponding of these slurries which, of course, rendered the land associated therewith permanently unusable. Subsequently, solids dewatering of such throwaway waste was approached using more conventional type equipment by thickening of same in a clarifier and then effecting final dewatering thereof in a drum, flatbed, or other type filter or centrifuge. However, as will be appreciated by those skilled in the art, such solids dewatering is more effectively and efficiently performed on sulfate rather than sulfite sludges. Sulfite sludges produced in conventional limestone scrubbers contain a preponderance of sulfite sulfur, as opposed to sulfate or oxidized sulfur. The exact amount of oxidation in the slurry solid is, of course, dependent on a number of factors such as the oxygen content of flue gas entering the scrubber, the slurry pH, etc. Unfortunately, when attempts are made to dewater sulfite sludges using a conventional clarifier/filter combination, the resulting solid usually has not been dewatered sufficiently to produce a solid suitable for landfill. For instance, such attempts usually produce a filter cake containing generally from about 45 to 60 percent solids. Since such materials display thixotropic characteristics until the solids content thereof exceeds about 68 to about 72 percent, they are generally unusable for purposes of solid landfill operations.

It has been well known, however, that when sulfite solids in such sludges are oxidized up to about 95-percent sulfate, waste solids dewatering thereof becomes much easier, and indeed, sludges of 85 percent solids or better are obtainable. The resulting dewatered sludges having water contents of less than about 15 or 20 percent have been determined suitable for landfill at the scrubber site. This approach to the problem has been termed, in the art, as slurry-forced oxidation and, although it affords a technical solution to the problem, it is fraught with significant economic disadvantages dictated by the capital investment necessary for the compressor capacity, tankage, and piping needed to supply oxidation air to the scrubbing loop slurry and also the subsequent operting costs thereof.

The present invention relates to flue gas desulfurization of the throwaway scrubbing system type employing the use of lime and/or limestone wherein the solid waste therefrom can be directly and easily dewatered above about 85 percent by utilization of conventional thickener/filter combinations and includes those "double alkali" systems using lime or limestone in the secondary loop. It has now been discovered that by adding to the recirculating scrubbing slurry in such systems, predetermined amounts of sodium thiosulfate or various additives derived from or related to sodium thiosulfate to maintain a concentration ranging from about 250 parts to about 2500 parts per million of thiosulfate ions in the scrubbing liquor, that the solid waste therefrom, to wit, the filter cake, will contain in the range from about 80 to about 90 percent solids and, accordingly, is eminently suitable for conventional landfill at the scrubber site. For the purposes of the present invention, although sodium thiosulfate is shown to be the additive utilized to provide the necessary predetermined amounts of thiosulfate ions in said scrubbing liquor, the thiosulfate ion can be derived from a plurality of sources such as, for example, other alkali metal salts, alkaline earth salts, thionates, etc. As an added attraction to the desirable characteristics associated with the present invention, it will also be appreciated that the predetermined quantities of additive are more than sufficient to prevent scale formation on the interior of the scrubber system and to minimize oxidation in some double alkali scrubbers.

Additional uses of thiosulfate have been reported in several flue gas desulfurization processes which are not directly related to the invention discussed herein. For example, the "Consol Process" involves thiosulfate but as an integral part of a recovery process that produces sulfur as a byproduct. This approach is not related to the present invention in that it has nothing to do with improving sulfite dewatering characteristics of sulfite flue gas desulfurization sludges. In the "Consol Process," flue gas is scrubbed in a packed tower with an aqueous solution containing various potassium salts. The actual removal of $SO_2$ occurs by reaction with carbonates. Sulfites are reduced to the thiosulfate by a reducing agent in a reaction drum in the scrubber circuit. The thiosulfate formed is noncatalytically reduced with a carbon monoxide-rich gas at elevated temperature and pressure. The $H_2S$ released is selectively removed and fed to a Claus plant for conversion to sulfur. Sulfate formation is low, but sulfates that are formed are removed as $K_2SO_4$.

The Citrate process also involves thiosulfate but as an integral part of the process that makes sulfur and does not involve a sulfite sludge. The Citrate double-loop regeneration is a modification to the earlier Bureau of Mines Citrate process. The liquor out of the absorber is regenerated in two steps or loops rather than the conventional one loop for the original Citrate process. In the first loop, the absorbed $SO_2$ is reacted with about 25 percent of the stoichiometric amount of $H_2S$ gas (required for reduction to sulfur) to convert the $SO_2$ to thiosulfate and polythionates without forming elemental sulfur. Most of this solution is recycled to the absorber. A slipstream from the first loop is reacted with greater than 75 percent of the stoichiometric $H_2S$ to convert the thiosulfate and polythionates to elemental sulfur. The sulfur slurry formed in the second loop should be sufficiently concentrated to melt and separate without treatment by a flotation step. The solution from the second loop is recycled to the absorber. Several variations of the Citrate process involve thiosulfate but do not involve the sulfite sludge dewatering characteristics that the instant invention teaches.

BACKGROUND OF THE INVENTION

1. Field of the Invention

The present invention relates to the broad field of flue gas desulfurization. Flue gas desulfurization, as it applies to the present invention, generally relates to the removal of sulfur dioxide ($SO_2$) from flue gases produced by fossil-fueled boilers used to generate electric power, process steam, etc. The Environmental Protection Agency promulgates regulations which require $SO_2$ removal devices or other means for controlling $SO_2$ emissions on many such flue gas producers, i.e., those that fire boilers with coal, oil, or other types of fossil fuel. The assignee of the present invention is, of course, a major producer of electric power, a portion of which is produced by the burning of fossil fuel, and has a major test facility at its Shawnee Power Plant wherein is conducted research in this field on technologies concerned specifically, but not exclusively, with desulfurization of flue gas from coal-fired power generation stations.

2. Description of the Prior Art

As was mentioned earlier, at the inception of utilizing lime and/or limestone scrubbing facilities for flue gas desulfurization, the scrubber wastes were initially disposed of by incorporating the slurry resulting therefrom in ponds. This procedure, which is termed by some as ponding, has proven to be environmentally unattractive because upon closure of the ponds, the acreage is completely unfit for any commerically attractive subsequent industrial or agricultural use thereof. As an alternate to this ponding approach, the method of dewatering the initial limestone scrubber slurry was turned to as a possible viable alternative. Following this approach, a substantial amount of the water resulting from the limestone scrubbing would be removed by various means from the scrubber slurry to increase thereby the solids content thereof and provide for disposal of same as solid landfill. This approach appears to be the most practical disposal method at present.

Accordingly, this approach dictates that the scrubber slurry be dewatered to a point wherein the solids resulting therefrom, usually in the form of filter cake, can be used directly as landfill. Furthermore, due to the large tonnages of material produced as waste from these processes, it goes without saying that transportation of same away from the production site thereof would greatly add to the cost of the overall operation. Accordingly, not only must the slurry be dewatered to the point wherein the resulting product is suitable for landfill, it must be in a form suitable for such purposes at or close to the site wherein it is produced. As was noted earlier, the sulfite sludges resulting from the throwaway lime or limestone scrubbing operations do not lend themselves to effective or efficient dewatering operations by conventional means. Such waste products generally cannot be dewatered directly to solids contents ranging greater than about 60 to 70 percent. Such materials exhibit thixotropic properties or can return to such state upon wetting and if they are not further treated but rather are placed directly in landfills at or near the plant site, they do not meet the criteria of being both economically and environmentally attractive. A technical solution to this problem is the approach of further processing such materials by forcing copious quantities of air into admixture therewith to effect oxidation therein of the sulfite to the sulfate form prior to the dewatering operation. Such a forced oxidation approach renders the resulting calcuim sulfate crystals in the sludge slurry generally satisfactory as far as the dewatering characteristics thereof; however, both the capital investment necessary for compressor capacity and the energy required to operate the compressors greatly adds to the cost of this approach.

Still another approach to rendering the sulfite sludge products usable for landfill is by the physical stabilization thereof which may be accomplished by effectively reducing the moisture content of the sludge to the point where the structural properties thereof are optimized when the material is disposed of in landfill. This may be accomplished by the addition thereto of relatively dry materials such as, for example, fly ash, soil, or other materials. This approach accomplishes at least two things: (1) it dries out the mixture by spreading entrained water throughout a larger weight of solids while modifying the particle-size distribution so that closer packing can be accomplished; and (2) the additional drying and closer packing usually result in increased shear strength, lower permeability, and lower combined volume of the two materials, which, in the case of fly ash and sludge, are both waste materials seeking disposal solutions. However, there are some major drawbacks to this approach, the principal one, perhaps, being that since minimal chemical reactions are involved, the stabilization process, to wit, adding a dry material to the slurry is, of course, reversible and if the mixture is subsequently rewetted, for instance by heavy rains, and allowed to saturate, the fluidization thereof will usually cause rapid decreases in shear strength leading to probable failure of structures supported thereupon and possible flow of the resulting uncontained sludge. In addition, insufficient fly ash may be available.

Yet another approach is chemical stabilization in which specific chemical binders or cementitious materials are added to the sludge. This binder addition, however, adds considerable expense and is not currently used extensively in the industry.

It should be readily apparent, of course, that the foregoing brief description of some of the prior art is perfunctory at best since voluminous periodicals and reports thereupon have been written, edited, and rewritten on the whole general subject area. Those skilled in the art interested in further pursuing such subject matter might avail themselves with copies of any of such numerous treatises including, for example, FGD Sludge Disposal Manual, Second Edition, of the Electric Power Research Institute dated September 1980.

SUMMARY OF THE INVENTION

In accordance with the present invention, it has now been discovered that a significant improvement may be provided in those flue gas desulfurization processes which use an aqueous absorbent medium and result in a sulfite-containing slurry byproduct. More particularly, the present invention is based on the discovery that such sulfite containing scrubber liquor slurries can be easily, effectively, and relatively cheaply rendered directly dewaterable by conventional thickening and/or filter methods to solid contents ranging upwards to about 80–90 percent, thereby rendering the resulting material nonthixotropic and characterized by having shear strengths sufficient and adequate for use in landfill operations. It has now been discovered that the simple addition and maintenance of predetermined quantitites of thiosulfate ion in the scrubbing loop of such flue gas desulfurization techniques ensures that the crystal habit of the resulting calcium sulfite results in the solids portion being recoverable from such processes as they, for example in the filter cake, are in a form that readily lends itself to more complete and effective dewatering than is the crystal habit of materials recovered in the filter cake from like processes wherein there is either no thiosulfate ion introduced and maintained in the scrubbing loop or the amount therein is less than the prescribed predetermined minimum amounts found to be necessary when practicing the teachings of the instant invention. As will be illustrated and described in more detail infra, the introduction of the thiosulfate ion in the scrubber loop in predetermined amounts, to wit, in the range from about 250 to 2500 ppm, acts either directly or indirectly, by means not yet completely known or understood, to yield rather large well defined, smooth, individual crystals of principally calcium sulfite which have been observed to be easily dewaterable. This modification of crystal habit is observed in both the filter cake and in the clarifier/thickener. Accordingly, faster settling rates in the clarifier allow for the use of less capital investment in this step of the process as well as in those steps already mentioned. This faster settling rate phenomenon is documented in Table 1 infra. In prior-art processes wherein such predetermined amounts of thiosulfate ion are not incorporated and maintained, including processes run at the test facilities of the assignee of the present invention, the observed crystal habit can perhaps be likened to porous lamellar aggregates of randomly oriented micaceous crystallites of calcium sulfate hemihydrate, thereby preventing the efficient and effective dewatering of the spent scrubber slurry.

OBJECTS OF THE INVENTION

It should be appreciated, or course, that the primary objects of the present invention are to devise techniques and methods for the incorporation in flue gas desulfurization sulfite sludge byproduct resulting from lime or limestone scrubbing enhanced and increased dewatering potential to thereby render such resulting dewatered sludges directly suitable and useful as landfill material.

DESCRIPTION OF THE DRAWINGS

The pesent invention, together with its desired objectives and further advantages thereof, will be better understood from a consideration of the following description taken in connection with the accompanying drawings in which:

FIG. 4 represents a photomicrographic display in the before and after mode of thiosulfate ion treatment in the scrubber slurry and depicts the crystal habits found in the filter cakes recovered therefrom. Both photographs were taken at magnifications of approximately 200 on a scanning electron microscope for the purpose of obtaining the rather great depth of field depicted thereon. The upper photograph represents the crystal habit found in the filter cake wherein no thiosulfate ion is present in the scrubbing slurry. The bottom photograph represents the modified crystal habit wherein about 600-ppm thiosulfate ions were present in the test loop. A comparison of these two depictions reveals the degree of crystal habit modification from a fluffy agglomeration of micaceous calcium sulfite hemihydrate crystals from which entrained water is not easily removable to the rather smooth monocrystalline particles of calcium sulfite hemihydrate resulting when the teachings of the instant invention are followed.

FIG. 5 is a depiction like that of FIG. 4 except that certain areas in both photographs comprising FIG. 4 were expanded to a magnification of about 700X. The upper photograph depicts porous lamellar aggregates of randomly oriented micaceous crystallites of calcium sulfite hemihydrate with associated fly ash wherein no thiosulfate ion is present in the scrubbing slurry. Such lamellar aggregates, of course, have the propensity to entrain and thereby trap solution between the stacked crystals.

The lower photograph depicts tabular prismatic single crystals of calcium sulfite hemihydrate with associated spherical fly ash. As in FIG. 4 above, a comparison of these two depictions reveals the degree of crystal habit modification obtained when following the teachings of the instant invention as compared to following the teachings of prior-art methods and techniques.

It is noted that in both photographs in this figure, the spherical fly ash particles show slight eliptical distortions due to spherical aberrations resulting from the photographic techniques utilized.

Figure 1:
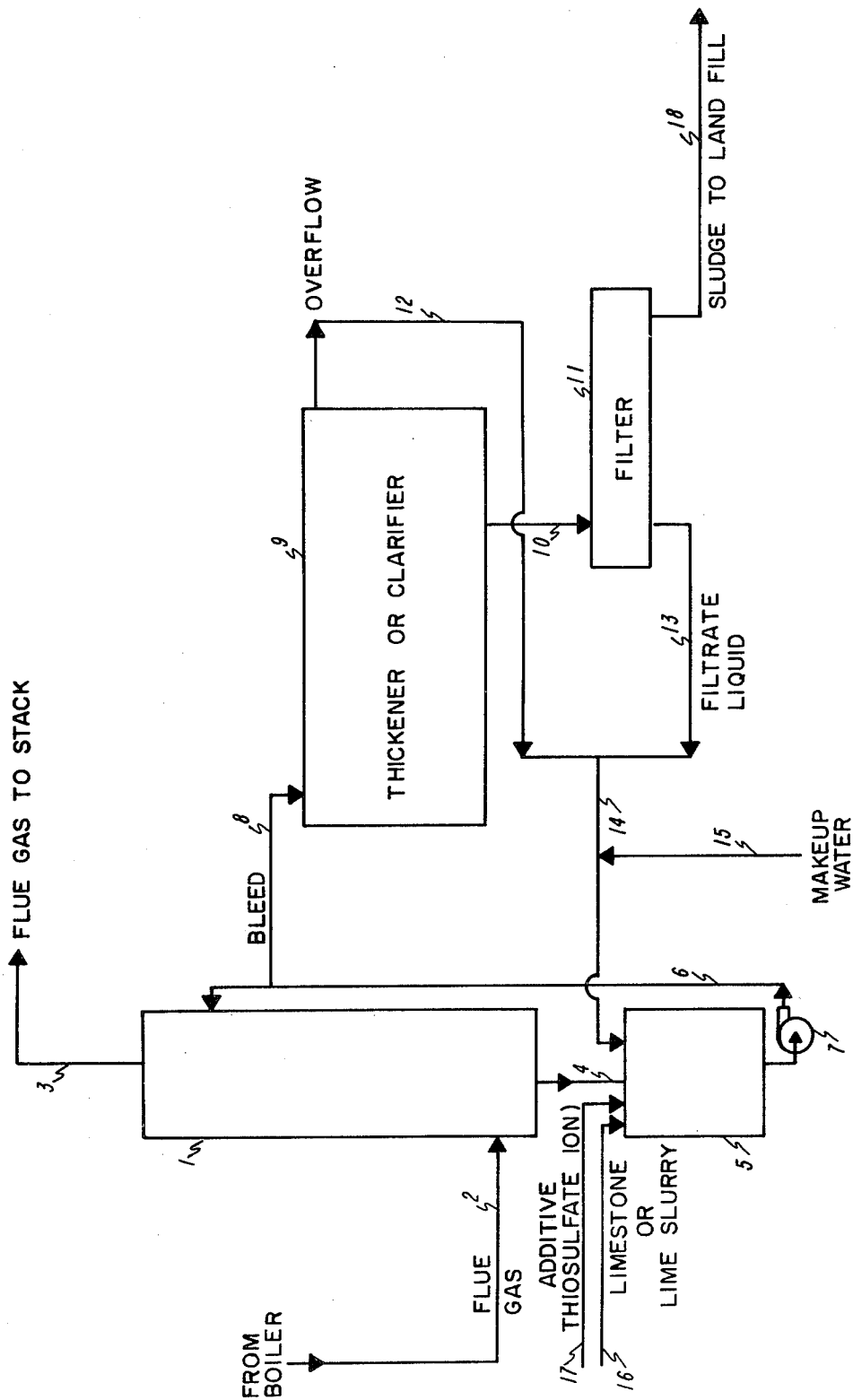
FIG. 1 represents a simplified flow diagram of a lime/limestone scrubber operation wherein the thiosulfate ion is introduced and maintained in the scrubbing loop thereof to result ultimately in the production of directly dewatered sulfite sludge having solid contents ranging upwards to 80–90 percent and shear strength sufficient and adequate for use thereof as landfill at or near the plant site.

Referring now more specifically to FIG. 1, flue gas to be desulfurized is removed from boiler means not shown via line 2 to scrubber means 1 wherein said sulfur oxide laden gases are placed in intimate contact with the absorbent rich scrubbing liquid. The resulting substantially desulfurized gas exits scrubber means 1 through line 3 to the atmosphere usually by chimney means, not shown. The absorption of the sulfur oxide laden stack gases is accomplished by the use of a slurry of lime or limestone circulated in scrubber means 1 and placed in intimate contact with said stack gases passed therethrough by means of spray towers, bubble plates, packing materials, etc. Said slurry usually consists of about 1 to 15 percent by weight solids and has a pH ranging from about 4.5 to about 9. Although not shown, the scrubbing slurry is usually but not necessarily passed countercurrent to the flow of flue gases as, for instance, wherein said scrubbing slurry is passed downwardly from the top of scrubbing means 1 and the stack gases are passed upwardly through scrubbing means 1. For most efficient operations, the amount of scrubbing slurry sprayed into scrubbing means 1 is predetermined to afford a liquid-to-gas ratio therein ranging from about 50 to about 150 gallons per minute of slurry per thousand actual cubic feet of gas. Resultant coalesced droplets of slurry containing stripped sulfur oxide values from the flue gases are removed from the lower portion of scrubbing means 1 via line 4 and introduced into makeup holding or slurry preparation tank 5. In many instances, this removal operation is carried out by means of utilizing the force of gravity to cause the coalesced droplets to fall into tank 5 through a liquid seal. The scrubbing slurry in holding tank 5 is continuously recycled through portions of the scrubbing loop via line 6 and pumping means 7 back to scubbing means 1. Simultaneously, a small bleed of the recirculated scrubbing slurry is removed from line 6 via line 8 and introduced into clarifier/thickener 9, which clarifier/thickener 9 acts to concentrate the solids in said slurry entering therein upwards to about 30 to 45 percent solids. A portion of the resulting concentrated slurry containing upwards to about 45 percent solids is removed from the lower portion of clarifier/thickener 9 via line 10 and introduced into filtering means 11. The filtrate from filtering means 11 is conducted via lines 13 and 14 back to holding or makeup tank 5. Concurrently therewith, a portion of overflow from clarifier/thickener 9 is conducted via lines 12 and 14 to holding tank 5. Additional or makeup lime or limestone for purposes of preparation or maintenance of the slurry may be added from a source not shown via line 16 to holding tank 5. Likewise, a source of thiosulfate ion from a source not shown necessary to prepare or maintain the predetermined necessary concentration in the slurry is added from a source not shown via line 17 to holding tank 5. For the purposes of the instant invention, the product therefrom of greatest interest as it relates to the instant invention, although it is considered a byproduct of the scrubbing operation, is the dewatered sludge removed from filtering means 11 via the line 18. Although FIG. 1 is typical of many conventional lime or limestone scrubbing operations, it should be appreciated, or course, that the present invention is not restricted to this flow scheme, but would be applicable to any of the multitude of flow schemes of commerical throwaway and regenerative processes as well as to similar schemes wherein some variations, such as the elimination of the clarifier/thickener, may be made or substituted with an equivalent thereof.

Figure 2:
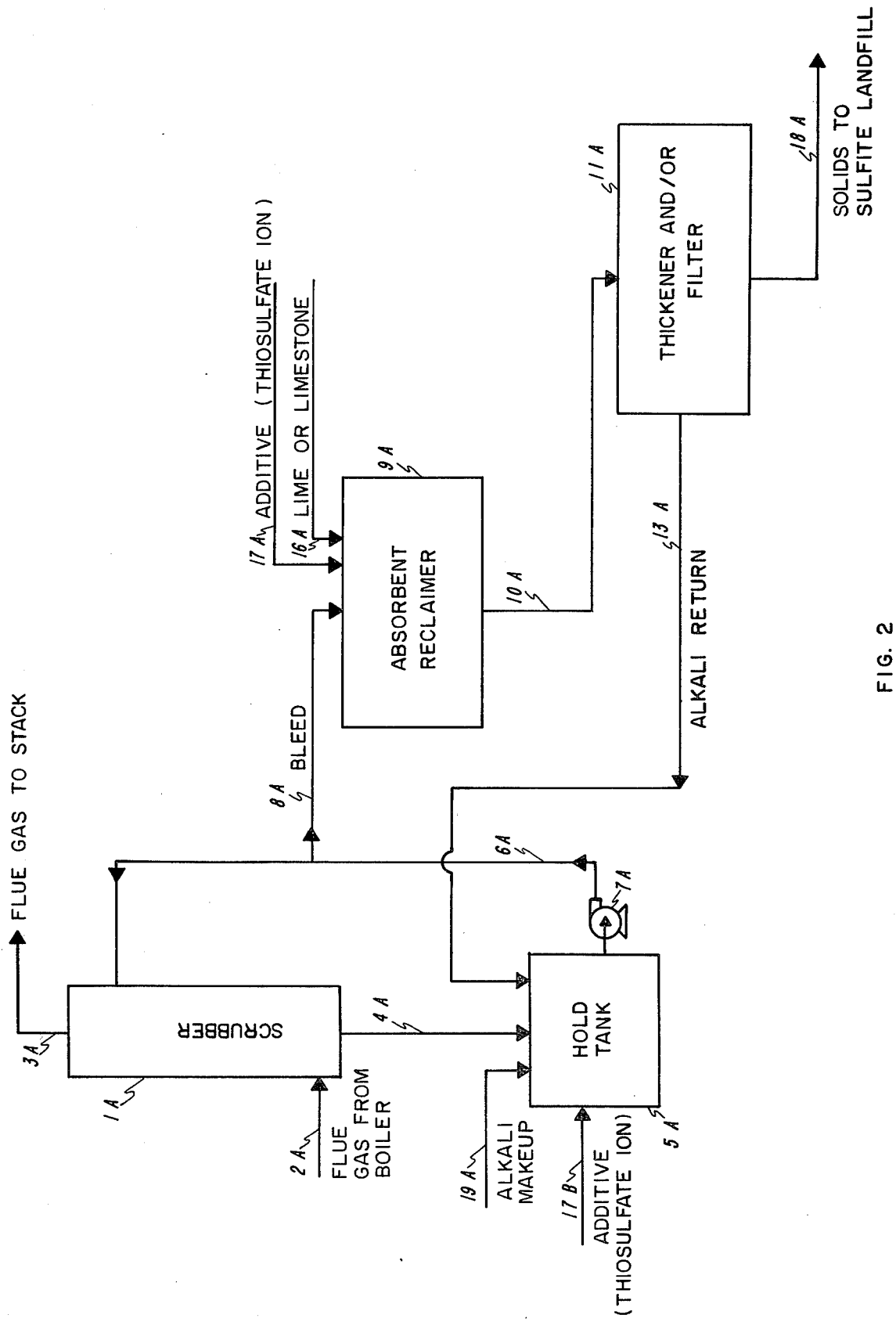
FIG. 2 is similar to FIG. 1 in that it represents a simplified flow diagram of a throwaway type $SO_2$ scrubbing system. This system, termed in the art as the "double alkali" process, resembles a throwaway lime/limestone scrubber approach in that it has a disposable waste product with little or no commerical appeal or use. Though it is like the recovery process mentioned supra, in that absorbent is regenerated in a device (reclaimer 9A), the point is emphasized that it should not be confused with a recovery-type $SO_2$ scrubbing system which produces a more attractive end product. The sodium- or potassium-based "double alkali" system requires close control of oxidation which produces undesired sulfate. With the additive of this invention, said oxidation is minimized, resulting in less purge and new material makeup.

Referring now more specifically to FIG. 2, therein is shown a flow diagram of a scrubbing scheme wherein the processing is slightly varied from that shown in FIG. 1, supra, in that an absorbent reclaimer is added before the thickener and/or filter device 11A to regenerate the alkali metal-based absorbent. In this "double alkali" throwaway scheme, the lime or limestone slurry makeup is fed directly to absorbent reclaimer 9A, as is the thiosulfate ion source, via lines 16A and 17A, respectively. The thiosulfate ion source may be more appropriately added to hold tank 5A by means of line 17B. Other similarities between the two schemes in FIGS. 1 and 2 will be readily apparent to those skilled in the art to which this invention relates, it being appreciated, however, that the scheme of operation in both depictions produces the byproduct high solids content, highly dewatered sulfite sludges, which are the principal objects of the instant invention and which high solids byproduct of sulfite sludge is so produced by direct dewatering thereof without the necessity of a forced-oxidation step and, further, which byproduct of highly dewatered sludge is eminently suitable for direct use in landfill applications.

Figure 3:
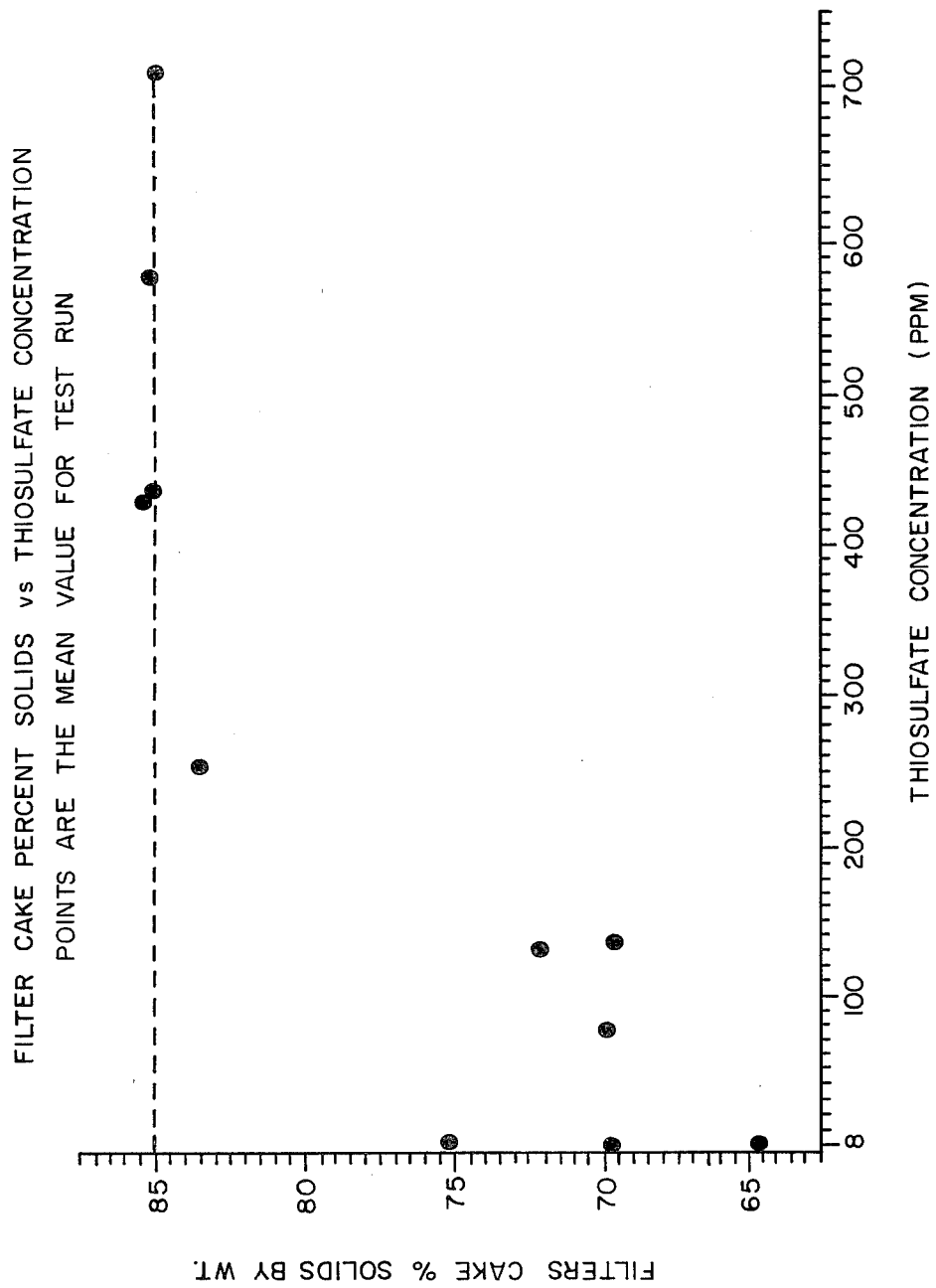
FIG. 3 represents a graphical illustration of the filter cake percent solid versus thiosulfate ion concentration in various test runs performed at the Shawnee Test Facility operated by the assignee of the present invention.

Referring now more specifically to FIG. 3, it will be appreciated that when less than about 250 ppm of thiosuflate ion concentration is utilized in the scrubber slurry, the resulting dewatered sludge, to wit, the filter cake, contains less than about 85 percent solids. Indeed, when only about 200 ppm of thiosulfate is used, the solids content of the resulting filter cake is only about equal to the maximum obtainable by prior-art methods and techniques, to wit, about 70 to 72 percent. As noted earlier, such materials containing about 70 percent solids oftentimes exhibit thixotropic properties, hence are unsuitable for use without further treatment thereof in landfill operations. Accordingly, it is apparent from the depiction in FIG. 3 that at least about 250 ppm of thiosulfate ion concentration must be used and maintained in the scrubber slurry. Although FIG. 3 does not clearly teach that a thiosulfate ion concentration of greater than about 600 ppm in the scrubber slurry is the preferred maximum amount taught and recited by the instant invention, it is apparent from the particular tests which provide the data base for this figure that increasing the concentration of the thiosulfate from about 250 ppm up to 700 ppm adds no viable or significant improvement in terms of the filter cake percent solids, albeit there are improvements in the settling rates of the crystals in the slurry, as discussed infra. From the data base from which this figure has been prepared as well as others observed in the development of the present invention, it has been established that the operating parameters for the concentration of thiosulfate in the scrubber solution ranges from about 250 ppm upwards to about 2500 ppm, the latter figure being established after due consideration of design characteristics involved in size scale to commerical capacity units, i.e., 800 to 1500 megawatts, etc., that the preferred operating parameter for thiosulfate concentation range is between about 300 ppm to about 1000 ppm, and that the most preferred concentration is about 600 ppm.

Referring now more specifically to FIGS. 4 and 5, it is readily apparent, as mentioned in the introductions to these two figures, supra, that there is indeed a substantial modification of the crystal habit in the with or without modes of operation in lime or limestone scrubbing systems in terms of thiosulfate concentration maintained therein at about 600 ppm. Although we, at the time of this writing, have not yet availed ourselves of similar photomicrographs of the crystal habit found in both the clarifier and filter wherein other concentrations of thiosulfate have been maintained, particularly those concentrations throughout the operating range of 250 ppm to about 2500 ppm, we have every reason to believe that similar modifications will be found particularly in view of the correlation between that shown at 600 ppm in FIGS. 4 and 5 when correlated against the increased settling rates in the clarifier/thickener and in the improved dewatering characteristics exhibited by the percent of solids in the filter cake observed at this particular concentration level. The correlations between the modified crystal habit, the increased settling rate in the clarifier/thickener and the increased percent solids in the filter cake are paralleled throughout the operating range of about 250 ppm to about 2500 ppm; accordingly, it will be readily appreciated that without the benefit of the teachings of the instant invention, those skilled in the art of operating lime or limestone scrubbing processes for the production of sulfite scrubber slurries and dewatered sludges therefrom are indeed producing crystallites of calcium sulfite hemihydrate which are porous lamellar aggregates having randomly oriented micaceous structures with effectively entrain and trap slurry solutions between the stacked crystals and which, therefore, obviously do not lend themselves well to either rapid settling in the clarifier/thickener or to efficient and effective dewatering in the filtering operation. On the other hand, it will be appreciated by those so skilled in this particular art that when the teachings of the instant invention are practiced and the thiosulfate ion concentration in the scrubbing slurry is maintained within the operating range of about 250 ppm to about 2500 ppm and preferably in the range of about 300 ppm to about 1000 ppm, such processes will produce an abundance of tabular prismatic single crystals of calcium sulfite hemihydrate which do not tend to entrain or trap scrubber solution, which are characterized by effective higher density than those crystallites produced by prior-art processes and therefore tend to settle much more rapidly in the clarifier/thickener, and finally and most importantly, which readily shed rather than entrain or trap slurry solution thereby presenting a posture of being easily dewaterable by conventional filtration means and methods.

DESCRIPTION OF THE PREFERRED EMBODIMENTS

In accordance with the teachings of the instant invention, sodium thiosulfate is added in amounts ranging from about 250 ppm to about 2500 ppm; more preferably from about 300 ppm to about 1000 ppm; and still more preferably at about 600 ppm of thiosulfate ion to the scrubbing slurry in lime/limestone scrubbers. It has been observed that the thiosulfate ion or products therefrom act to alter the agglomerative characteristics of the spent-slurry crystals making them settle from suspension faster and dewater more readily when filtered.

It should perhaps be noted that other sources of thiosulfate ion may be utilized to accomplish these results. These include ammonium, calcium, potassium, and magnesium salts, as well as the sodium salt, of thiosulfuric acid. In addition, polythionic acids that are reduced in the scrubbing slurry to thiosulfate ion can also be utilized. These include the alkali and alkaline earth salts of trionic and tetrionic acids. According to the teachings of the instant invention, the solid additive or additive dissolved in aqueous medium is used to impart a thiosulfate ion concentration in the scrubbing slurry liquor in the desired amounts of from about 250 to about 2500 ppm. This concentration is maintained by continuous addition of the additive to the scrubber slurry sufficient to offset chemical and physical losses in the system. In operating the processes of the instant invention, it has been observed that there appears to be an increase in regeneration of thiosulfate in the clarifier/thickener, particularly in the lower portions thereof. This may perhaps be explained at least in part by the fact that thiosulfate is unstable in acidic solutions such as exist in the scrubber unit and recycle lines and vessels adjacent to the scrubber in the system. The thiosulfate decomposes to yield sulfite, sulfur, sulfide, sulfate, and/or polythionates. The thiosulfate also reacts with lower sulfur acids and sulfides that may be present in the solution to form polythionic acids. It also can react with polythionates, forming higher polythionates.

Much of the work on qualitative investigation of thiosulfate decomposition and the indicated reactions, primarily by paper chromatography, has been summarized by Pollard et al.[1] in the background discussion accompanying the description of their research. Pollard et al. found that the first product of thiosulfate decomposition in HCl solution was sulfur, and the first sulfur acid product was trithionate. With time, up to 80 minutes, the appearances of tetrathionate and pentathionate were observed. They conclude that the sequence of reactions involved is the following.

[1] F. H. Pollard, G. Nickless, and R. B. Glover, "The Decomposition of Acidified Thiosulfate and Polythionate Solution," J. of Chromatography 15, 518 (1964).

$$H_2S_2O_3 \rightarrow H_2S + SO_3$$

$$H_2S + 2SO_3 \rightarrow H_2S_3O_6$$

$$S_3O_6^{--} + H^+ + S_2O_3^{--} \rightarrow S_4O_6^{--} + HSO_3^-$$

$$S_4O_6^{--} + H^+ + S_2O_3^{--} \rightarrow S_5O_6^{--} + HSO_3^-$$

$$S_5O_6^{--} + H^+ + S_2O_3^{--} \rightarrow S_6O_6^{--} + HSO_3^-$$

et cetera to higher thionates. Results of a number of studies of the reactions and interactions under various conditions indicate that the following equilibrium applies:

$$S_nO_6^= + S_2O_3^= \underset{OH^-}{\overset{H^+}{\rightleftharpoons}} S_{n+1}O_6^= + SO_3^=.$$

Increase of acidity or decrease of sulfite concentration (e.g., due to the precipitation of calcium sulfite) will favor shift of the equilibrium to the right, consuming thiosulfate and lower polythionates and producing higher polythionates and sulfite. This would be the situation when the scrubber slurry is acidic, while it is in and just after it has left the scrubber and while it is in the recycle loop and recycle tank. Increase of base strength or decrease of acidity would tend to favor shift of the equilibrium to the left, consuming sulfite and higher polythionates and producing thiosulfate and lower polythionates. This would be the situation in the clarifier where the solids and liquid equilibrate, making the solution basic due to the dissolution of additional calcium carbonate. The sulfite required to feed the thiosulfate-producing reaction would be supplied by dissolution of the calcium sulfite formed by the $SO_2$ scrubbing reaction. This would explain the high concentrations of thiosulfate observed in the underflow from the clarifier. Conclusions supporting this interpretation were drawn from thermodynamic considerations and calculations in 1975 in the assignee's offices by one of the instant coinventors.

An added benefit resulting from the utilization of the thiosulfate additive is the observed inhibition of sulfate scaling in the interior of the scrubber vessel and associated piping. Eariler tests at the Shawnee Test Facility, supra, were actually conducted to confirm some earlier reports that concentrations of thiosulfate therein in the range of about 100 ppm effectively acts to reduce sulfate scaling in the interior of the scrubber as well as the conduit associated therewith. These particular tests were held to so confirm the eariler reports and, as such, it will be appreciated that when the teachings of the instant invention are followed, specifically, but not exclusively, for the purposes of rendering sulfite sludges from the lime or limestone scrubbing more easily and effectively dewatered up to about 80 to about 90 percent solids, the scale inhibition characteristics of said thiosulfte ion are also realized.

As has been noted, the preferred operating parameter as to concentration of the thiosulfate ion in the scrubbing slurry liquor required for the production of waste material suitable for landfill is in the range of about 300 to about 1000 ppm, although larger amounts upwards of about 2500 ppm have been found to be quite useful. It has been determined that the most preferred concentration of thiosulfate ion in the scrubber slurry is at about 600 ppm.

In early tests it was determined that at the operating pH therein of 5.8, the thiosulfate additive was effective throughout the range set forth supra. It is also postulated that said thiosulfate ion additive is equally effective throughout moderate changes in pH in the scrubbing operation ranging from a pH of about 4.5 to a pH of about 9.

THEORY OF THE INVENTION

It has been theorized that through some modification in the structure or electric charge of the crystal of solid sulfite, however small, agglomerations that normally entrap aqueous droplets are reduced or eliminated making the individual crystals cleaner and less prone to hold water. This, of course, has been clearly demonstrated by the scanning electron micrographs of crystals from the filter cake as depicted in FIGS. 4 and 5, supra. As has also been noted, modifications of the crystal agglomeration by the thiosulfate additive is seen not only during filtration, but also during settling in the clarifier/thickener. Indeed, laboratory settling tests clearly demonstrated a more rapid solid settling rate upon addition of thiosulfate ion to the scrubbing liquor, and as also reported supra, there is a close correlation between the increased settling rate and the percent solids in the filter cake throughout the operating range of 250 ppm to about 2500 ppm. There are some indications, however, that the greatest settling rates occur at thiosulfate additive concentrations of between about 600 ppm and about 2500 ppm.

ADVANTAGES OF THE INVENTION

The present invention exhibits numerous advantages over processes and methods of the prior art. Perhaps the major advantages are: the production of a dewatered lime/limestone scrubber sulfite sludge without the use of forced oxidation normally required to allow sufficient dewatering thereof to produce a waste material suitable for landfill. The savings in capital investment and operating costs of the required compressor capacity and operation which would be required if forced-oxidation procedures were needed to convert the sulfite slurry crystals to sulfate crystals are, of course, substantial. In addition, the alteration in the agglomeration characteristics of the spent-scrubber sludge indeed favors much more rapid settling in clarifiers and thickeners. This, of course, translates into decreased surface requirements in the thickener, thereby further reducing both capital and operating costs. Further, the teachings of the instant invention save substantial time and labor normally required to clean and descale scrubbers operating under prior-art teachings wherein sulfate scaling thereof is not inhibited as it is when the dictates of the present invention are followed. Finally, the present invention can be applied to a multiplicity of $SO_2$ scrubbers now in use throughout the world. The scrubbers can be of the throwaway type using lime or limestone as the active scrubbing agent or the "double alkali" process of the type which utilizes lime or limestone to reclaim the active scrubbing agent before discarding the sulfite waste product.

In order that those skilled in the art may better understand how the present invention can be practiced and more fully and definitely understood, the following examples are given by way of illustration and not necessarily by way of limitation.

EXAMPLES

In these tests, a limestone scrubber at the Shawnee Test Facility was coupled with a 150,000-watt steam generator. The generator was steam driven and used high-sulfur coal as fuel. Spent flue gas from the steam generator containing approximately 2400 ppm of $SO_2$ gas was used as input to the limestone scrubber. The limestone scrubber was a vertical cylindrical vessel 40 feet high and 8 feet in diameter of rubber-lined carbon steel. Exposed interior surfaces such as spray nozzles were constructed of 316L stainless steel for corrosion resistance. Slurry spray nozzles inside the absorber vessel were connected to three headers, each supplying 600 gallons/minute of recirculated slurry from a hold tank situated below the scrubber vessel. The effluent hold tank was 20 feet in diameter by 21 feet high and contained a maximum of 49,000 gallons. For corrosion resistance, the carbon steel hold tank was lined with an organic coating (Flakeline). Crushed limestone was ground in a ball mill to provide approximately 12 tons/day of crushed stone at a fineness such that 80 percent will pass through a 200-mesh screen. The mill uses a charge of steel balls and crushes the dried stone to the required fineness without the use of liquid or any additives. Coarse stone left after milling is recycled using a closed loop for maximum utilization of stone.

Spent slurry is bled from the scrubber effluent hold tank on a continuous basis to a clarifier. The basicity of the scrubbing slurry is maintained by pumping fresh (60 percent by weight) limestone slurry directly to the scrubber effluent hold tank. This slurry is prepared in a small 500-gallon mix tank by the addition of dry, powdered limestone to sufficient water while using an agitator to bring the slurry up to the required concentration.

Spent slurry was dewatered in a conventional thickener holding about 37,000 gallons. The thickener used a rake in the conical bottom to assist in more rapid settling. The thickener underflow containing about 40 percent solids was pumped to a flat bed filter for final dewatering. The filter consists of a moving horizontal perforated rubber belt with a contact area 40 feet long by 10 feet wide. The slurry solids rest directly upon a filter cloth adjacent to the belt surface. The dewatered cake was discharged into a chute at the extreme end of the filter.

During the tests, desulfurization of the flue gas was taking place to the extent that about 75 percent of the original $SO_2$ introduced thereinto was removed. The scrubber liquor:gas ratio was 65 gallons per thousand actual cubic feet at saturated absorber conditions which were normally about 125° F. The percent solids in the recirculating scrubber slurry was 15 percent. The percent solids in the filter cake discharge was only about 65 percent and too low to produce a material directly suitable for landfill. Subsequently, when 600 ppm thiosulfate ion was introduced and maintained in the scrubber slurry through the addition of predetermined quantities of sodium thiosulfate thereto, the filter cake solids content increased to over 85 percent, which, of course, is sufficient for the material to be used directly for landfill. During operation of the limestone scrubber facility in these tests, all operating conditions remain unchanged other than no thiosulfate was added to the scrubber slurry in the first portion thereof wherein the filter cake solids content thereof was only 65 percent and about 600 ppm thiosulfate ion was maintained in the scrubber slurry during the second portion of the testing wherein the filter cake solids content increased to over 85 percent. See Table 1 below.

and filter cake percent solids for each test run were used. This reduces the amount of variations and emphasizes the underlying trend. Several specific examples can be made from a simple examination of the data.

EXAMPLE I

The examples presented here were run in the equipment described supra, and they are presented in Table 1, arranged in order of increasing thiosulfate ion ($S_2O_3=$) concentration. See also FIG. 3. Example I is an estimate chosen from the plotted data in FIG. 3 that is representative of a near optimum for solids dewatering.

This is chosen to teach proper conditions for good dewatering. This example teaches that, at the test conditions listed in the table, 85 weight percent solids result from a thiosulfate ion concentration of 600 ppm as estimated from FIG. 3.

EXAMPLES II, III, AND IV

These examples are treated in a group as they are base case runs in which the thiosulfate ion concentration is maintained at or nearly 0. In these three runs, the weight percent solids in the filter cake ranges from about 65 to 75 percent. This result compared to Example I illustrates the marked improvement in solids concentration obtained in the filter cake when thiosulfate ion concentration of about 600 ppm is maintained in the scrubbing slurry which is the primary teaching of the instant invention.

EXAMPLES V, VI, AND VII

Examples V, VI, and VII have increasing concentrations of thiosulfate ion as presented in Table 1. However, they are treated here together as a group of intermediate examples that do not give the full dewatering effect that is desired to practice the invention. FIG. 3 illustrates this intermediate range of effect on the resulting filter cake weight percent solids. This group of example runs were run with all independent parameters TABLE 1
EXAMPLES OF RUN RESULTS
SHAWNEE TEST FACILITY
SODIUM THIOSULFATE TEST SERIES
(May–August 1982)

| Example No. | Test | $S_2O_3=$ | Filter Cake, wt. % Solids* | Nominal Flue Gas Rate, acfm @300° F. | Nominal Slurry Recirc. Rate, gpm | Settling Rate ml/min** |
|---|---|---|---|---|---|---|
| I*** | | 600.0 | 85.0 | 35,000 | 1,800 | — |
| II | 200 | 0.0 | 75.2 | 35,000 | 1,800 | 6.2 |
| III | 214 | 0.0 | 64.7 | 35,000 | 1,800 | 3.7 |
| IV | 234 | 0.4 | 69.8 | 35,000 | 1,800 | 4.6 |
| V | 235 | 75.8 | 69.9 | 35,000 | 1,800 | 5.0 |
| VI | 213 | 129.8 | 72.2 | 35,000 | 1,800 | 3.8 |
| VII | 224 | 133.5 | 69.7 | 35,000 | 1,800 | — |
| VIII | 203 | 251.0 | 83.6 | 35,000 | 1,800 | 6.5 |
| IX | 202 | 424.9 | 85.4 | 35,000 | 1,800 | 9.1 |
| X | 212 | 432.2 | 85.1 | 35,000 | 1,800 | 8.2 |
| XI | 201 | 576.2 | 85.2 | 35,000 | 1,800 | 14.2 |
| XII | 211 | 709.0 | 84.9 | 35,000 | 1,800 | — |

Note:
Flue gas to be desulfurized in the limestone scrubber was taken as a slipstream from a large 150-megawatt equipment steam boiler, commercially used to produce electric power. This assured flue gas composition was representative of that produced on a full-scale boiler. The pH was maintained throughout at 5.8.
*Solids include water of crystallization.
**Settling rate tests were done in a 1000 ml graduated cylinder and data were calculated by the method of initial slopes.
***Estimate from FIG. 3 to illustrate good parameters.

The relationship between thiosulfate and filter cake percent solids can be seen in FIG. 3. The dashed line on the graph respresents the goal of 85 percent solids. For this plot, the mean values of thiosulfate concentration as nearly constant as possible with the exception of the thiosulfate ion concentration in the absorbent slurry which was varied from run to run. In each run, the thiosulfate ion concentration was maintained at a constant level in the absorbent slurry. There was actually very little, if any, effect on the filter cake weight percent solids for these intermediate thiosulfate ion levels of approximately 50 ppm to 150 ppm.

EXAMPLE VIII

In Example VIII, the thiosulfate ion concentration was increased to 251 ppm in the absorbent slurry. This concentration produced a filter cake with 83.6 percent solids and was the first run with clearly a dramatic and positive effect on the solids dewatering potential with the conventional belt filter used for all the runs.

EXAMPLES IX AND X

These two examples had thiosulfate ion concentrations very nearly identical at about 425–430 ppm in the absorbent slurry. Results from both of these runs further illustrate the dramatic effect of the thiosulfate ion concentration on the resulting filter cake waste product. The resulting filter cake from both of these example runs demonstrated a weight percent solids in excess of 85 percent (85.4 and 85.1 percent, respectively).

EXAMPLE XI

Example XI had a thiosulfate ion concentration of 576 ppm that was significantly higher than the examples discussed supra. Though no further effect on the filter cake waste product percent solids in excess of the examples supra, Example XI continues to illustrate dramatically the teachings of the invention as the resulting filter cake weight percent solids was still in excess of 85 percent at 85.1 percent. This example is very close in comparison to the conditions chosen for Example I and indicate that even though the invention dewatering effect was obtained at a lower thiosulfate ion concentration that this level near 600 ppm is clearly sufficient to effect the teachings of the instant invention.

EXAMPLE XII

This example run contained the highest level of thiosulfate ion of the listed examples, at 709 ppm in the absorbent slurry. While the resulting filter cake had a very slight decrease in weight percent solids, to 84.9, from Example XI, the small magnitude of only 0.2 weight percent is not considered significant. This example also clearly demonstrates the teachings of this invention.

CONCLUSIONS

Examples VIII through XII teach that a filter cake with a very consistent weight percent solids is obtained at these conditions that is clearly improved over the base case runs of no or very low thiosulfate ion and therefore illustrate the teachings of the instant invention. It is considered significant, also, that these examples were run on a prototype (nearly commercial) scale unit rather than a small laboratory or bench scale unit. This makes them immediately applicable to some commercial scale desulfurization units, factors of size scaleup being considered.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. In an improved process for the removal of $SO_2$ from an input gas stream containing $SO_2$ wherein the input gas stream is contacted, in a gas-liquid scrubbing zone, with an aqueous scrubbing slurry containing an alkaline reagent wherein said alkaline reagent contained in said scrubbing slurry is selected from the group consisting of lime, limestone, or mixtures thereof at scrubbing conditions selected to form a resulting treated gas stream containing substantially less $SO_2$ than said input gas stream and a resulting $SO_2$ enriched scrubbing slurry containing as a substantial portion of the solids therein calcium sulfite hemihydrate; subsequently effecting at least a partial dewatering of said $SO_2$ enriched scrubbing slurry; and removing the resulting at least partially dewatered sludge to waste disposal; the improvement in combination therewith for substantially increasing the yield of solids in said dewatered sludge to thereby render same eminently suitable for use in solid landfill waste disposal operations, which improved process comprises adding to and maintaining in said aqueous scrubbing slurry from about 250 ppm to about 2500 ppm of thiosulfate ion, said improved process characterized by the fact that the addition and maintenance of said amounts of thiosulfate ion in said aqueous scrubbing slurry is sufficient to effect therein a crystal habit of the calcium sulfite hemihydrate comprising a substantial portion of the solids therein in a tabular prismatic mode and substantially eliminates therein the occurrence of porous lamellar aggregates of randomly oriented micaceous crystallites of said calcium sulfite hemihydrate, thereby altering the agglomerative characteristics of said crystallites in the spent slurry removed from said gas-liquid scrubbing zone to a mode which substantially increases the settling rate thereof and results in the ultimate dewatering of said sludge up to the range of about 80 to 90 percent solids by weight.

2. An improved process as defined in claim 1 wherein the source of said thiosulfate ion is selected from the group consisting of thiosulfate salts of sodium, potassium, ammonium, calcium, magnesium, and mixtures thereof.

3. An improved process as defined in claim 2 wherein the source of said thiosulfate ion is the sodium salt of thiosulfuric acid.

4. An improved process as defined in claim 1 wherein said source of thiosulfate ion is derived by the reduction of polythionic acid salt to thiosulfate ion in said scrubbing slurry, said polythionic acid salt selected from the group consisting of alkali and alkaline earth salts of trionic and tetronic acids.

5. An improved process as defined in claim 2 wherein the thiosulfate ion concentration ranges from about 300 ppm to about 1000 ppm.

6. An improved process as defined in claim 2 wherein the thiosulfate ion concentration is maintained at about 600 ppm.

7. In an improved process for the removal of $SO_2$ from an input gas stream containing $SO_2$ wherein the input gas stream is contacted, in a gas-liquid scrubbing zone, with an aqueous scrubbing solution containing a dissolved alkaline reagent at scrubbing conditions selected to form a resulting treated gas stream containing substantially less $SO_2$ than said input gas stream and a resulting $SO_2$ enriched scrubbing solution having an increased sulfur loading; introducing at least a portion of the resulting SO$_2$ enriched scrubbing solution into scrubbing reagent recovery means, together with a stream of slurry containing substantially undissolved alkaline reagent, wherein said alkaline reagent contained in said surry is selected from the group consisting of lime, limestone, or mixtures thereof said slurry containing said substantially undissolved alkaline reagent having a pH greater than the pH of said solution containing said dissolved reagent; maintaining both of said alkaline reagents in intimate contact in said scrubbing reagent recovery means at conditions sufficient to convert at least a portion of said dissolved alkaline reagent therein to a decreased sulfur loading substantially equivalent to that of said aqueous scrubbing solution prior to its SO$_2$ enrichment and returning same to said gas-liquid scrubbing zone and converting at least a portion of said undissolved alkaline reagent introduced into said scrubbing reagent recovery means to crystallites of calcium sulfite hemihydrate to thereby effect the production of an SO$_2$ enriched slurry; subsequently effecting at least a partial dewatering of said SO$_2$ enriched slurry; and removing the resulting at least partially dewatered sludge to waste disposal; the improvement in combination therewith for substantially increasing the yield of solids in said dewatered sludge to thereby render same eminently suitable for use in solid landfill waste disposal operations, which improved process comprises adding to said scrubbing reagent recovery means from about 250 ppm to about 2500 ppm of thiosulfate ion, said improved process characterized by the fact that the addition of said amounts of thiosulfate ion in said scrubbing reagent recovery means is sufficient to effect therein a crystal habit of the calcium sulfite hemihydrate comprising a substantial portion of the solids therein in a tabular prismatic mode and substantially eliminates therein the occurrence of porous lamellar aggregates of randomly oriented micaceous crystallites of said calcium sulfite hemihydrate thereby altering the agglomerative characteristics of said crystallites in the slurry removed from said scrubbing reagent recovery means to a mode which substantially increases the settling rate thereof and results in the ultimate dewatering of said sludge up to the range of about 80 to about 90 percent solids by weight.

8. An improved process as defined in claim 7 wherein the source of said thiosulfate ion is selected from the group consisting of thiosulfate salts of sodium, potassium, ammonium, calcium, magnesium, and mixtures thereof.

9. An improved process as defined in claim 8 wherein the source of said thiosulfate ion is the sodium salt of thiosulfuric acid.

10. An improved process as defined in claim 7 wherein said source of thiosulfate ion is derived by the reduction of polythionic acid salt to thiosulfate ion in said slurry, said polythionic acid salt selected from the group consisting of alkali and alkaline earth salts of trionic and tetronic salts.

11. An improved process as defined in claim 8 wherein the thiosulfate ion concentration ranges from about 300 ppm to about 1000 ppm.

12. An improved process as defined in claim 8 wherein the thiosulfate ion concentration is maintained at about 600 ppm.

* * * * *